(12) United States Patent
Davis

(10) Patent No.: US 12,095,209 B1
(45) Date of Patent: Sep. 17, 2024

(54) QUICK CONNECTING OUTLET COVER AND ASSOCIATED COMPONENTS

(71) Applicant: Brian Lee Davis, Ripon, WI (US)

(72) Inventor: Brian Lee Davis, Ripon, WI (US)

(*) Notice: Subject to any disclaimer, the term of this patent is extended or adjusted under 35 U.S.C. 154(b) by 393 days.

(21) Appl. No.: 17/544,821

(22) Filed: Dec. 7, 2021

Related U.S. Application Data

(60) Provisional application No. 63/129,473, filed on Dec. 22, 2020.

(51) Int. Cl.
| | |
|---|---|
| *H01R 24/76* | (2011.01) |
| *F21S 8/00* | (2006.01) |
| *F21V 21/002* | (2006.01) |
| *H01R 4/30* | (2006.01) |
| *H01R 33/88* | (2006.01) |
| *H01R 33/90* | (2006.01) |
| *H01R 103/00* | (2006.01) |
| *H01R 107/00* | (2006.01) |
| *H02G 3/14* | (2006.01) |

(52) U.S. Cl.
CPC ............... *H01R 24/76* (2013.01); *F21S 8/03* (2013.01); *F21V 21/002* (2013.01); *H01R 4/30* (2013.01); *H01R 33/90* (2013.01); *H02G 3/14* (2013.01); *H01R 33/88* (2013.01); *H01R 2103/00* (2013.01); *H01R 2107/00* (2013.01)

(58) Field of Classification Search
CPC .......... H01R 24/76; H01R 4/30; H01R 33/90; H01R 33/88; H01R 2103/00; H01R 2107/00; F21S 8/03; F21V 21/002; H02G 3/14
USPC ..................................................... 439/620.21
See application file for complete search history.

(56) References Cited

U.S. PATENT DOCUMENTS

| | | | |
|---|---|---|---|
| 2,015,698 | A | 10/1935 | Tiffany |
| 2,179,198 | A | 11/1939 | Reed |
| 2,420,000 | A | 5/1947 | Linton |
| 2,580,056 | A | 12/1951 | Wheeler, Jr. |
| 3,307,030 | A | 2/1967 | De Francisco |
| 3,588,489 | A | 6/1971 | Gaines |
| 4,000,405 | A | 12/1976 | Horwinski |
| 4,255,780 | A | 3/1981 | Sakellaris |
| 4,755,913 | A | 7/1988 | Sleveland |

(Continued)

OTHER PUBLICATIONS

Glocover, 1 Gang Duplex Plastic Wall Plate with a nightlight—White, Model #: GC-CCDO-W, viewed at https://www.homedepot.com/p/GloCover-1-Gang-Duplex-Plastic-Wall-Plate-with-a-nightlight-White-GC-CCDO-W/312574677 on May 20, 2020. 4 pages.

*Primary Examiner* — Gary F Paumen
(74) *Attorney, Agent, or Firm* — Brannen Law Office, LLC

(57) ABSTRACT

An electrical receptacle is provided having electrical connection screws with a shaft, a drive head and an intermediate head. The shaft has a threaded end that is suitable to be selectably turned into the receptacle until electrical wires are pressed between the receptacle and the intermediate head. The drive head is opposite the threaded end of the shaft. A seat is provided between the drive head and intermediate head. A cover is provided having prongs that engage the screws in the seats. The width of the seats provides a lateral tolerance to engagement of the prong and screw. The prongs can be flared at their ends to engage the seat and the prong bodies are held in contact against the seat to provide a secure electrical connection. Electronics can be embedded within the cover so that it glows or shines.

10 Claims, 14 Drawing Sheets

(56) References Cited

U.S. PATENT DOCUMENTS

| | | | |
|---|---|---|---|
| 4,774,641 A | 9/1988 | Rice | |
| 4,912,809 A * | 4/1990 | Scheuer | F16B 9/058 16/443 |
| 6,023,891 A * | 2/2000 | Robertson | B66F 9/12 52/125.4 |
| 6,087,588 A | 7/2000 | Soules | |
| 6,423,900 B1 | 7/2002 | Soules | |
| 6,928,778 B2 * | 8/2005 | Schmid | F16B 35/048 52/363 |
| 7,959,391 B2 * | 6/2011 | Lien | B26F 1/32 411/401 |
| 8,134,075 B1 * | 3/2012 | Vail | H02G 3/14 248/129 |
| 8,912,442 B2 | 12/2014 | Smith | |
| 9,035,180 B2 | 5/2015 | Smith et al. | |
| 9,035,181 B2 | 5/2015 | Smith et al. | |
| 9,362,728 B2 | 6/2016 | Smith et al. | |
| 9,482,426 B2 | 11/2016 | Diotte | |
| 9,755,374 B2 | 9/2017 | St. Laurent et al. | |
| 9,768,562 B2 | 9/2017 | Smith et al. | |
| 9,774,154 B2 | 9/2017 | St. Laurent et al. | |
| 9,787,025 B2 * | 10/2017 | Smith | H02G 3/14 |
| 9,807,829 B2 * | 10/2017 | Jensen | H01H 1/00 |
| 9,832,841 B2 | 11/2017 | Knight et al. | |
| 9,871,324 B2 | 1/2018 | Smith et al. | |
| 9,882,318 B2 | 1/2018 | Smith et al. | |
| 9,882,361 B2 * | 1/2018 | Smith | H05B 45/00 |
| 9,917,430 B2 * | 3/2018 | Smith | H02G 3/081 |
| 10,109,945 B2 | 10/2018 | Smith et al. | |
| D849,510 S | 5/2019 | Knight et al. | |
| 10,291,007 B2 | 5/2019 | Smith et al. | |
| 10,468,834 B2 | 11/2019 | Diotte | |
| 10,644,461 B2 | 5/2020 | Smith et al. | |
| 2015/0101458 A1 * | 4/2015 | Saje | F16B 35/06 411/401 |

* cited by examiner

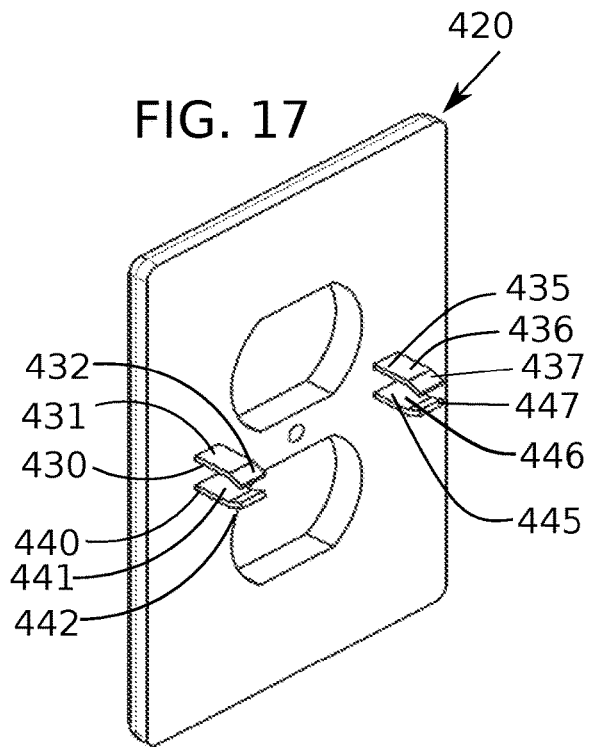
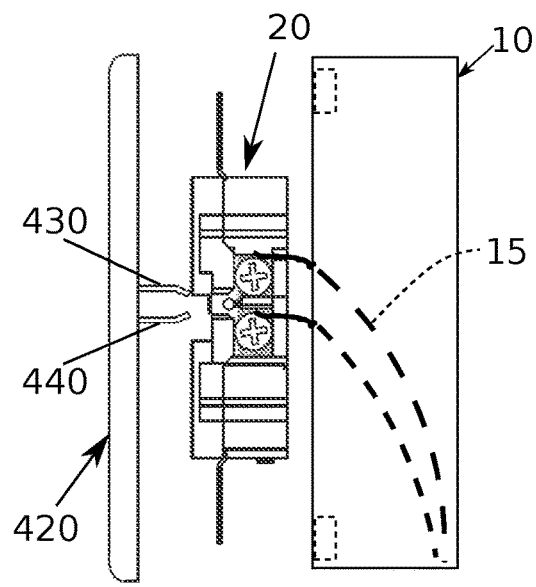
FIG. 17
FIG. 18
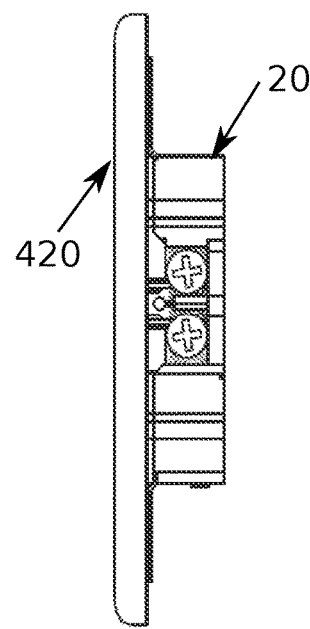
FIG. 19

QUICK CONNECTING OUTLET COVER AND ASSOCIATED COMPONENTS

This United States utility patent application claims priority on and the benefit of provisional application 63/129,473 filed Dec. 22, 2020, the entire contents of which are hereby incorporated herein by reference.

BACKGROUND OF THE INVENTION

1. Field of the Invention

The present invention relates to a quick connecting outlet cover with electrical components that has prongs that engage seats on the receptacle screws.

2. Description of the Related Art

At night, people turn on lights to see inside their homes. For example, people often turn on lights when they are awake and active within their homes. Yet, when a light is turned on in the middle of the night (for example in a hallway or bathroom), it can be very bright for the person who turned the light on and disrupting to others who may be sleeping.

Understanding this situation, people routinely utilize night lights to overcome the issues related to turning on bright lights at night. Night lights emit a small amount of light in areas, such as bathrooms and hallways, so that people can sufficiently see without needing to turn on bright lights. Yet, there are some disadvantages of traditional night lights. First, the night lights extend forward from the outlets and into the room. People, pets and/or other objects can contact the night lights causing them to malfunction or be removed from the outlet. Further, the night lights may be unattractive to some people. Still further, the night light plugs into an outlet, rendering it unavailable for other uses while the night light is in use.

Some products have been developed to address this concern by integrating a light source into a cover plate. One product attempts to engage the end of the outlet wiring screws by biasing contacts to laterally engage the screws. Yet, this product with lateral bias is susceptible to missing with wiring screws or not having a tight engagement therewith.

Thus, there exists a need for an outlet cover with electrical components that solves these and other problems.

SUMMARY OF THE INVENTION

An electrical receptacle is provided having electrical connection screws with a shaft, a drive head and an intermediate head. The shaft has a threaded end that is suitable to be selectably turned into the receptacle until electrical wires are pressed between the receptacle and the intermediate head. The drive head is opposite the threaded end of the shaft. A seat is provided between the drive head and intermediate head. A cover is provided having prongs that engage the screws in the seats. The width of the seats provides a lateral tolerance to engagement of the prong and screw. The prongs can be flared at their ends to engage the seat and the prong bodies are held in contact against the seat to provide a secure electrical connection. Electronics can be embedded within the cover so that it glows or shines.

According to one advantage of the present invention, the receptacle receives a screw having a drive head and an intermediate head. Advantageously, a user uses a driver to selectably turn the screw via the drive head into and out of full engagement with the receptacle. In full engagement, electrical wiring is firmly held between the receptacle and intermediate head thereby powering the receptacle.

According to another advantage of the present invention, the cover can have prongs to engage the screws to create an electrical connection to power electronics embedded within or contained on the cover.

According to another advantage of the present invention, the screw can have a seat between the drive head and the intermediate head. In a preferred embodiment, a prong engages the seat of the screw.

Advantageously, the seat can have a width dimension, which provides a lateral tolerance for the prong to engage the screw. The lateral tolerance allows the prong to engage the screw regardless of how fully received the screw is relative to the receptacle. Further, the seat allows the prong to engage the screw even if the cover is not initially fully centered over the receptacle. This allows the prongs to engage the screws and then the cover to be centered over and fastened to the receptacle.

According to a still further advantage of the present invention, the seat can be bound by the intermediate head and the drive head. The heads create lateral boundaries to prevent inadvertent disengagement of the prong to the screw along the longitudinal axis of the screw.

According to a still further advantage yet of the present invention, the prong can be biased to engage the seat. This is preferably accomplished with spring tension.

According to a still further advantage yet of the present invention, each prong can have a flare at the distal end to ensure the prong is moved to the proper side of the shaft during engagement. This ensures that the biasing spring tension applies to maintain engagement of the prong and screw.

According to a still further advantage yet of the present invention, each prong can have a designed longitudinal tolerance to ensure that it is long enough to engage the respective screw.

According to a still further advantage yet of the present invention, each prong is electrically connected to cover electronics whereby the wires powering the receptacle also power the cover electronics (which can be a light).

According to an advantage of an embodiment of the present invention wherein the prongs have round bodies, the prongs can bend in 360 degrees relative to their longitudinal axis. Further, the screws can have intermediate and drive heads with tapered sides or faces that face each other. Both of these features, either alone or in combination, promote engagement between the prongs and the screw seats as portions of prongs that contact an angled face would be directed by the angled face towards the seat.

Other advantages, benefits, and features of the present invention will become apparent to those skilled in the art upon reading the detailed description of the invention and studying the drawings.

BRIEF DESCRIPTION OF THE DRAWINGS

FIG. 17 is a rear perspective view of an alternative preferred embodiment of a cover of the present invention.

FIG. 18 is similar to FIG. 17, but additionally shows a receptacle and an electric box.

FIG. 19 is similar to FIG. 17, but shows the cover connected to the receptacle.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
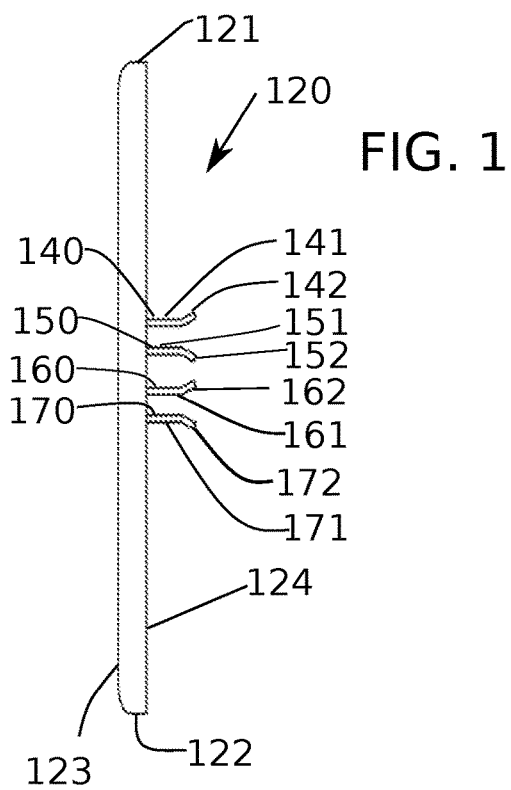
FIG. 1 is a side view of a preferred embodiment of a cover of the present invention.
Figure 2:
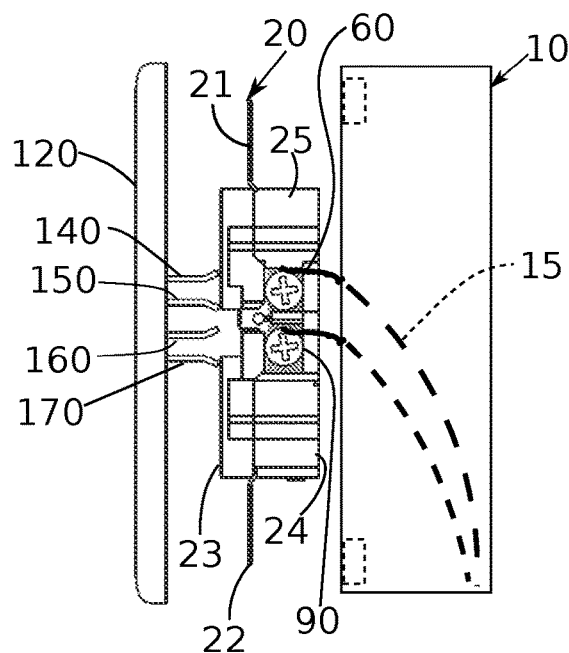
FIG. 2 is similar to FIG. 1, but additionally shows a receptacle and an electric box.
Figure 3:
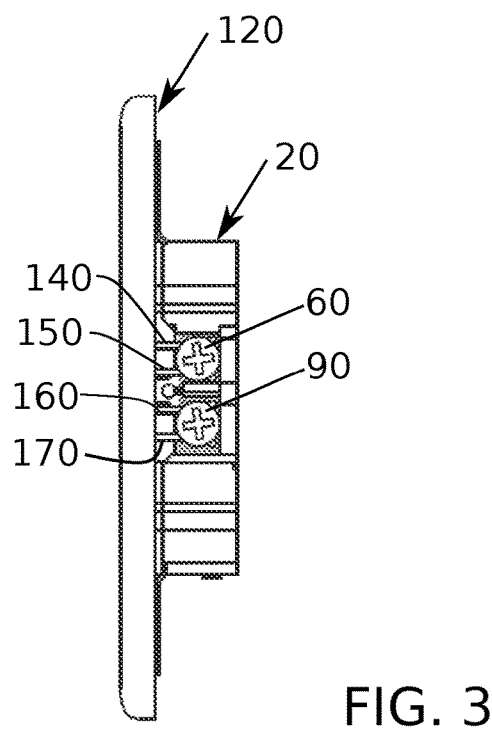
FIG. 3 is similar to FIG. 1, but shows the cover connected to the receptacle.

The present invention is useful with a receptacle 20 received within an electric box 10. Electric boxes 10 come in many sizes and shapes. Electric wires 15 extend into the box 10 are connected to the receptacle, as seen in an exploded view in FIG. 2 to provide electric power to the receptacle.

An exemplary receptacle 20 is illustrated in FIGS. 2, 3 and 10-13. The receptacle 20 has a top 21, a bottom 22, a front 23, a back 24 and opposed sides 25 and 26, respectively. In the illustrated example, there is a top outlet 30 and a bottom outlet 35. Two screw holes 40 and 41 are on side 25 of the receptacle. Electrical elements for the outlets are located at the holes 40 and 41, and a connector 42 is provided to electrically interconnect the electrical elements. Two screw holes 50 and 51 are on side 26 of the receptacle. Electrical elements for the outlets are located at the holes 50 and 51, and a connector 52 is provided to electrically interconnect the electrical elements.

It is appreciated that while a two-outlet receptacle is illustrated, aspects of the invention can be equally applied to other wired components, such as but not limited to switches, multi-gang outlets, combination devices, etc., without departing from the broad aspects of the present invention.

Figure 4:
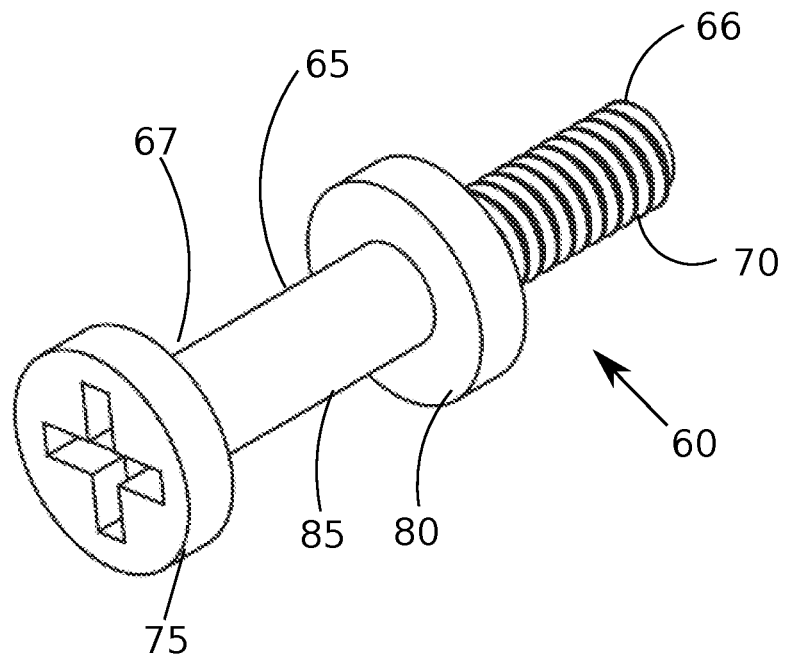
FIG. 4 is a perspective view of a preferred embodiment of a screw of the present invention.
Figure 5:
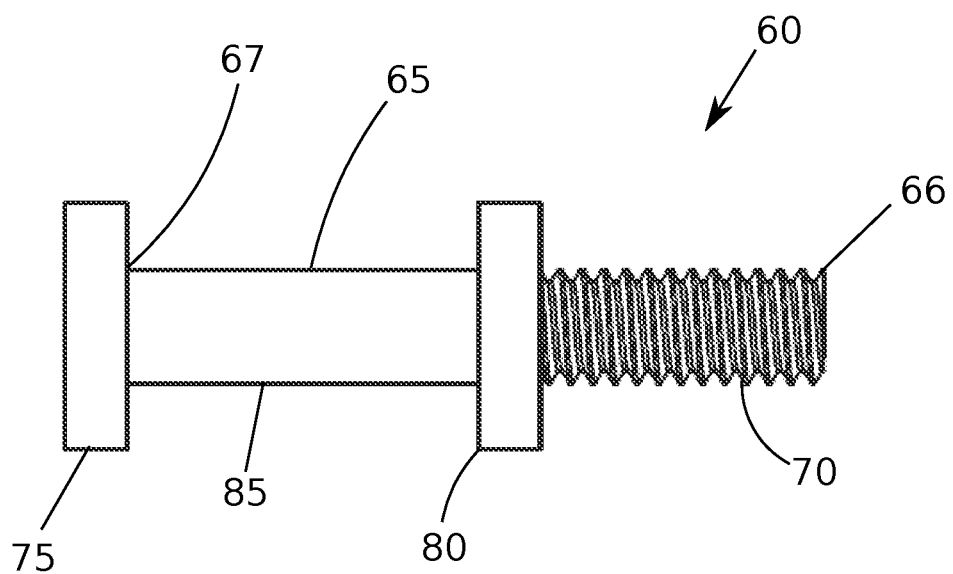
FIG. 5 is a side view of the preferred embodiment illustrated in FIG. 4.
Figure 6:
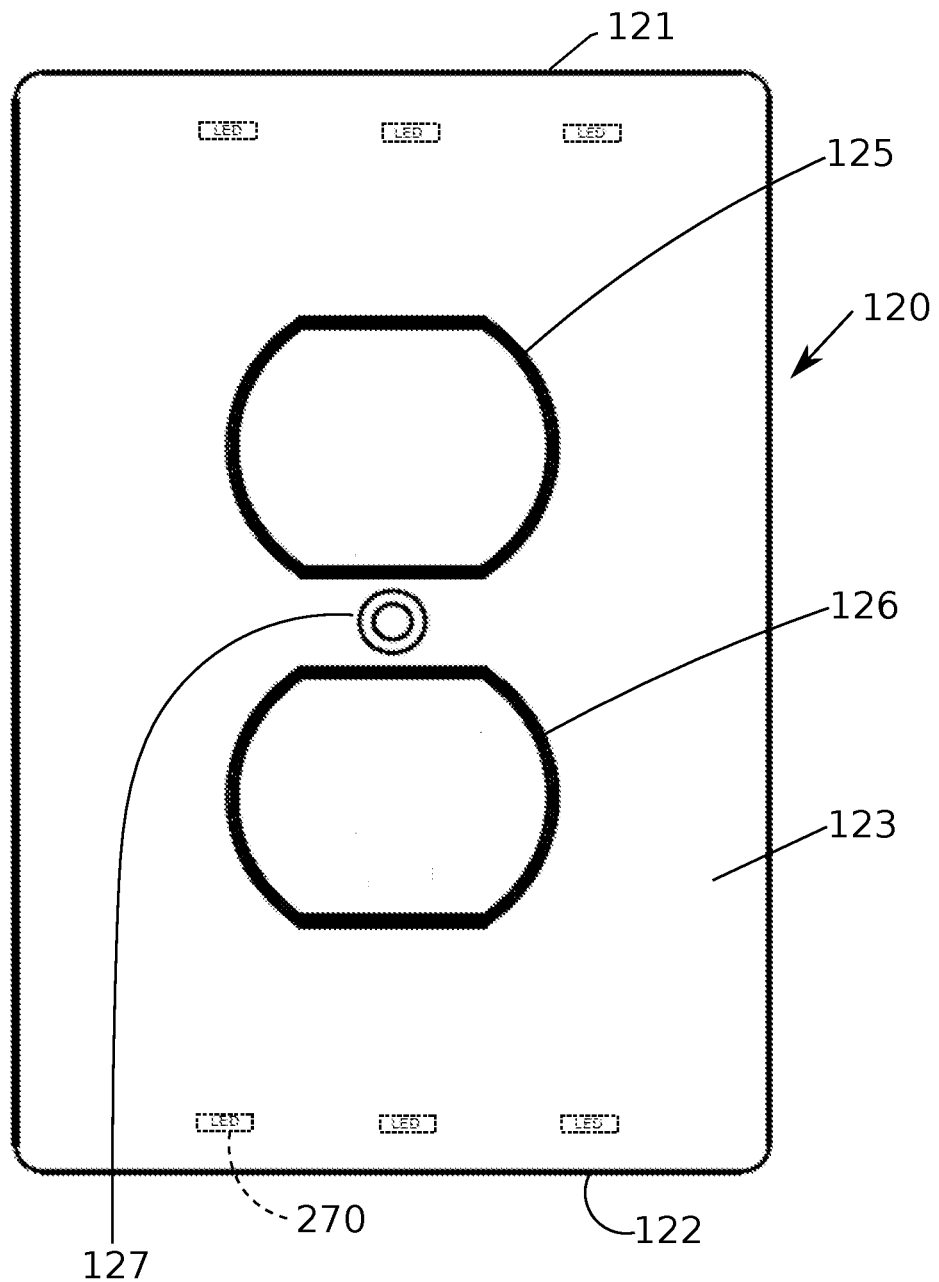
FIG. 6 is a front view of the preferred embodiment of the cover of the present invention.

Turning now to FIGS. 4 and 5, it is seen that a preferred embodiment of a screw 60 is provided. The screw 60 has a shaft 65 with a first end 66 and a second end 67. A drive head 75 is at the second end 67 of the shaft. Drive head 75 has indentations to interact with a driver, such as a Phillips driver. It is understood that other shapes including but not limited to flat-head, square-head, and star-shaped indentations could be used without departing from the broad aspects of the present invention. The first end 66 of the shaft is threaded with threads 70. An intermediate head 80 is between the first and second ends 66 and 67 of the shaft. The intermediate head 80 and drive head 75 are preferably disc shaped lying in parallel planes, and each have round outer profiles. The portion of the shaft 65 between the heads 75 and 80 is a seat 85. The length of the seat 85 along the screw longitudinal axis is the distance between the heads 75 and 80.

There are preferably four screws 60, 90, 100 and 110 in the illustrated embodiment (i.e. one for each screw hole). However, there could be more or fewer without departing from the broad aspects of the present invention. Each of the screws is preferably similar or identical to each other.

A preferred embodiment of a cover 120 of the present invention is illustrated in FIGS. 1-3 and 6-13. The cover 120 has a top 121, a bottom 122, a front 123 and a back 124. Two outlet holes 125 and 126 are provided and are shaped and sized to allow access to outlets 30 and 35 of the receptacle. A fastener hole 127 is provided through the middle of the cover for fastening the cover 120 to the receptacle 20 in a manner wherein a cover perimeter edge contacts the wall. Eight prongs 140, 150, 160, 170, 180, 190, 200 and 210 are preferably provided. The prongs are preferably arranged in groups of two.

Prong 140 has a body 141 and a flare 142. Prong 150 has a body 151 and a flare 152. Prongs 140 and 150 are preferably grouped together and cooperate with each other. Bodies 141 and 151 are preferably flat and spaced apart a selected amount, which is preferably slightly less than shaft width of screw 60. Flares 142 and 152 are divergent relative to the bodies wherein the distance between the paired prongs is greater at the flare distal ends than at the flare proximal ends. The prongs have a spring bias towards the seat of the screw when engaging the seat of the screw.

Prong 160 has a body 161 and a flare 162. Prong 170 has a body 171 and a flare 172. Prongs 160 and 170 are preferably grouped together and cooperate with each other. Bodies 161 and 171 are preferably flat and spaced apart a selected amount, which is preferably slightly less than shaft width of screw 90. Flares 162 and 172 are divergent relative to the bodies wherein the distance between the paired prongs is greater at the flare distal ends than at the flare proximal ends. The prongs have a spring bias towards the seat of the screw when engaging the seat of the screw.

Prong 180 has a body 181 and a flare 182. Prong 190 has a body 191 and a flare 192. Prongs 180 and 190 are preferably grouped together and cooperate with each other. Bodies 181 and 191 are preferably flat and spaced apart a selected amount, which is preferably slightly less than shaft width of screw 100. Flares 182 and 192 are divergent relative to the bodies wherein the distance between the paired prongs is greater at the flare distal ends than at the flare proximal ends. The prongs have a spring bias towards the seat of the screw when engaging the seat of the screw.

Prong 200 has a body 201 and a flare 202. Prong 210 has a body 211 and a flare 212. Prongs 200 and 210 are preferably grouped together and cooperate with each other. Bodies 201 and 211 are preferably flat and spaced apart a selected amount, which is preferably slightly less than shaft width of screw 110. Flares 202 and 212 are divergent relative to the bodies wherein the distance between the paired prongs is greater at the flare distal ends than at the flare proximal ends. The prongs have a spring bias towards the seat of the screw when engaging the seat of the screw.

Figure 9:
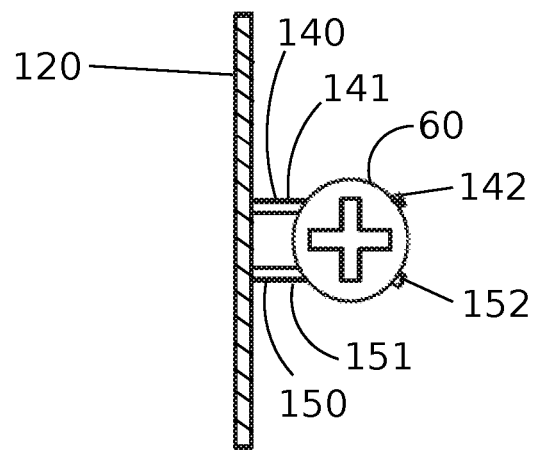
FIG. 9 is an isolation perspective view of the prongs engaging the seat.
Figure 10:
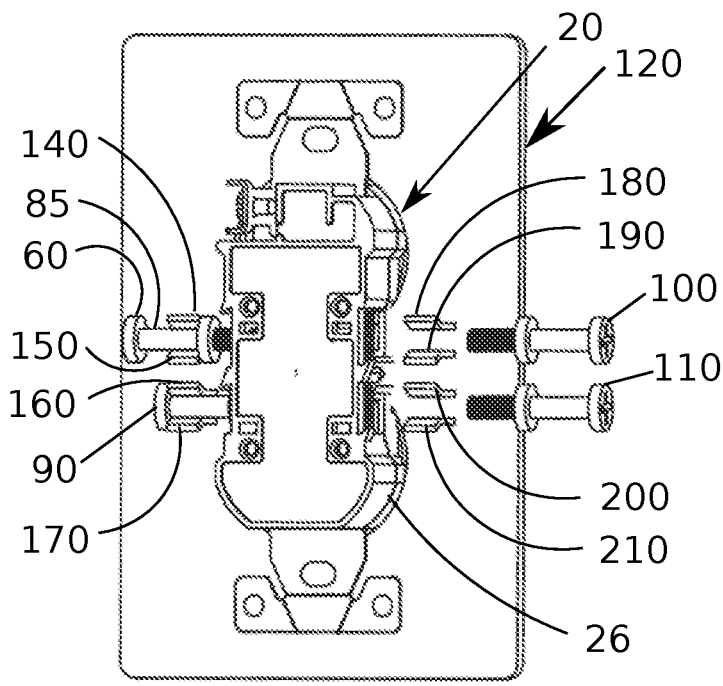
FIG. 10 is a rear perspective view of the present invention.
Figure 11:
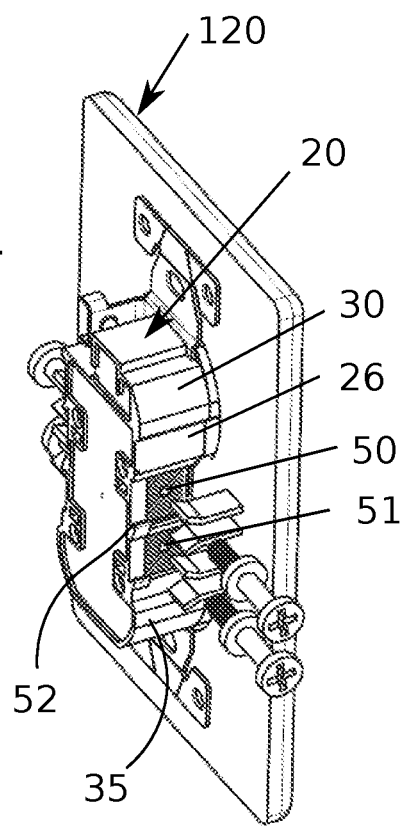
FIG. 11 is an alternative rear perspective view of the present invention.
Figure 12:
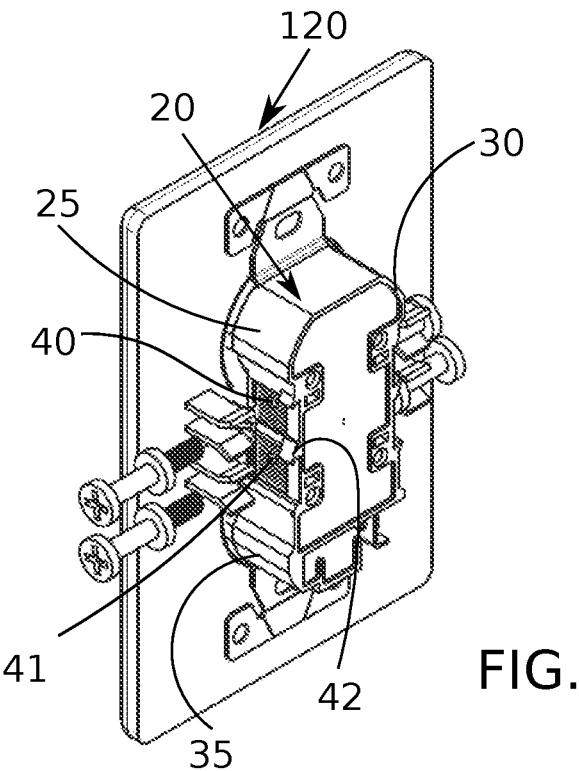
FIG. 12 is an alternative rear perspective view of the present invention.

A pair of prongs 140 and 150 is shown engaging a screw 60 in FIG. 9. It is seen how the screw 60 is directed towards the area between prong bodies 141 and 151. Further insertion will result in the prongs engaging the seat 85 of screw 60. The flares provide an alignment tolerance whereby even if the cover starts off-center relative to the screw, the prongs will still engage the screw. The prong spring bias ensures engagement of the prongs 140 and 150, respectively, and the seat 85.

The length of the prongs 140 and 150 provide longitudinal tolerance whereby the prongs can engage the screw even if the screw is more or less recessed in the electrical box.

The width of the seat 85 of the screw provides lateral tolerance (along screw shaft longitudinal axis) wherein the prongs engage the seat regardless of how far the screw 60 is turned into screw hole 40. Also, the width of the seat provides a tolerance for moving the cover into close proximity with the receptacle as the prongs engage the screws, respectively.

Figure 7:
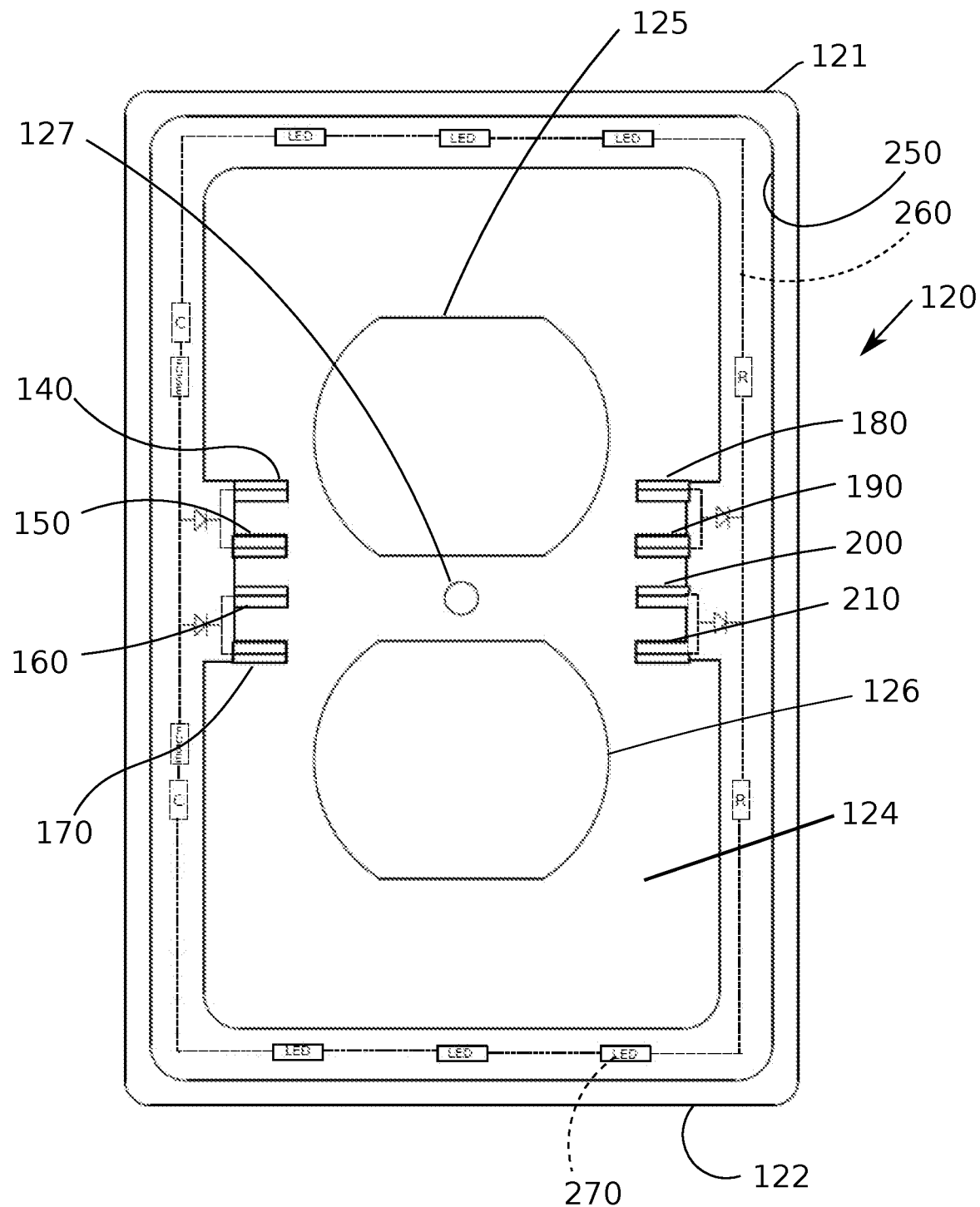
FIG. 7 is a rear view of the preferred embodiment of the cover of the present invention.
Figure 8:
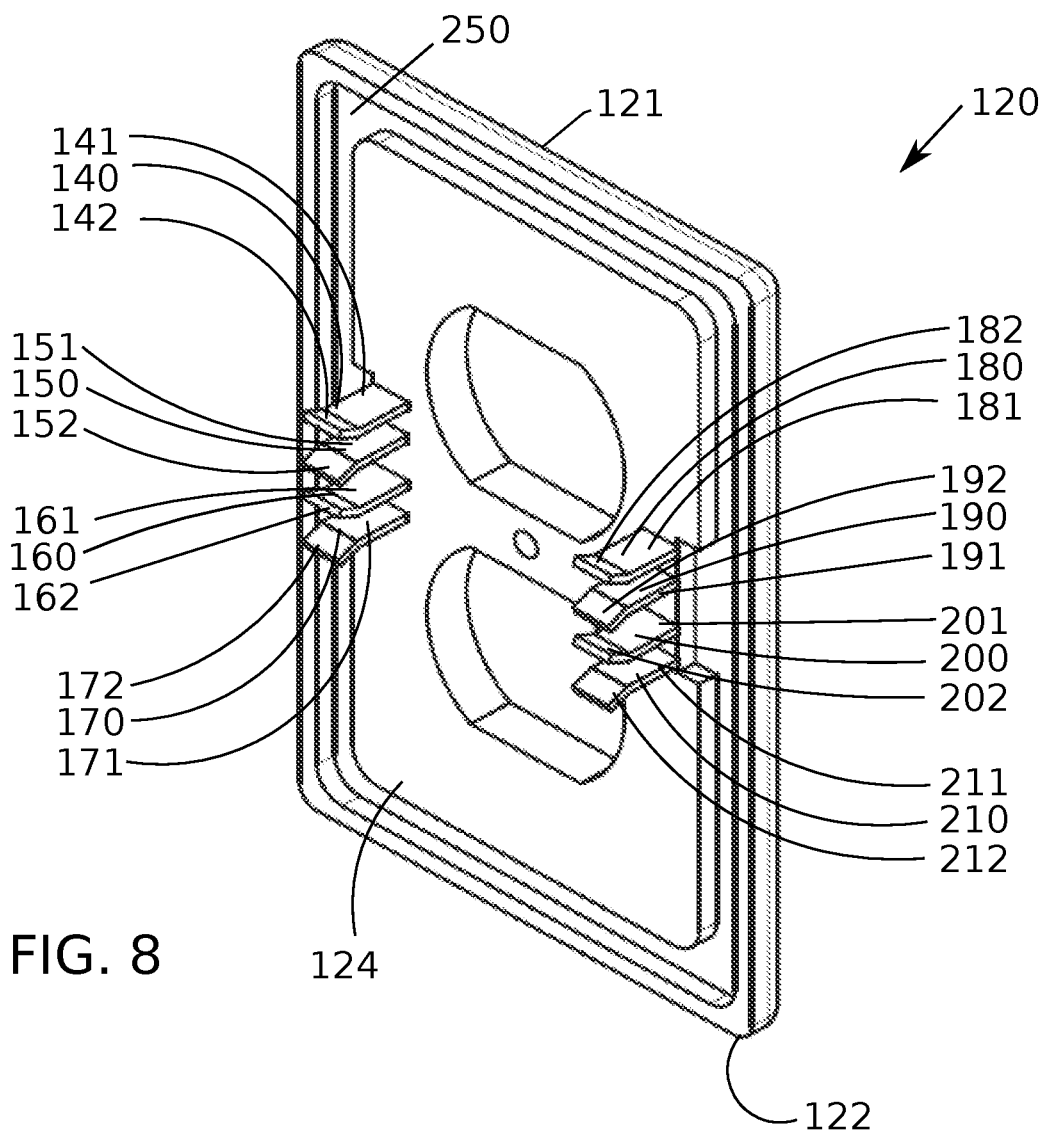
FIG. 8 is a perspective rear view of the preferred embodiment of the cover of the present invention.
Figure 13:
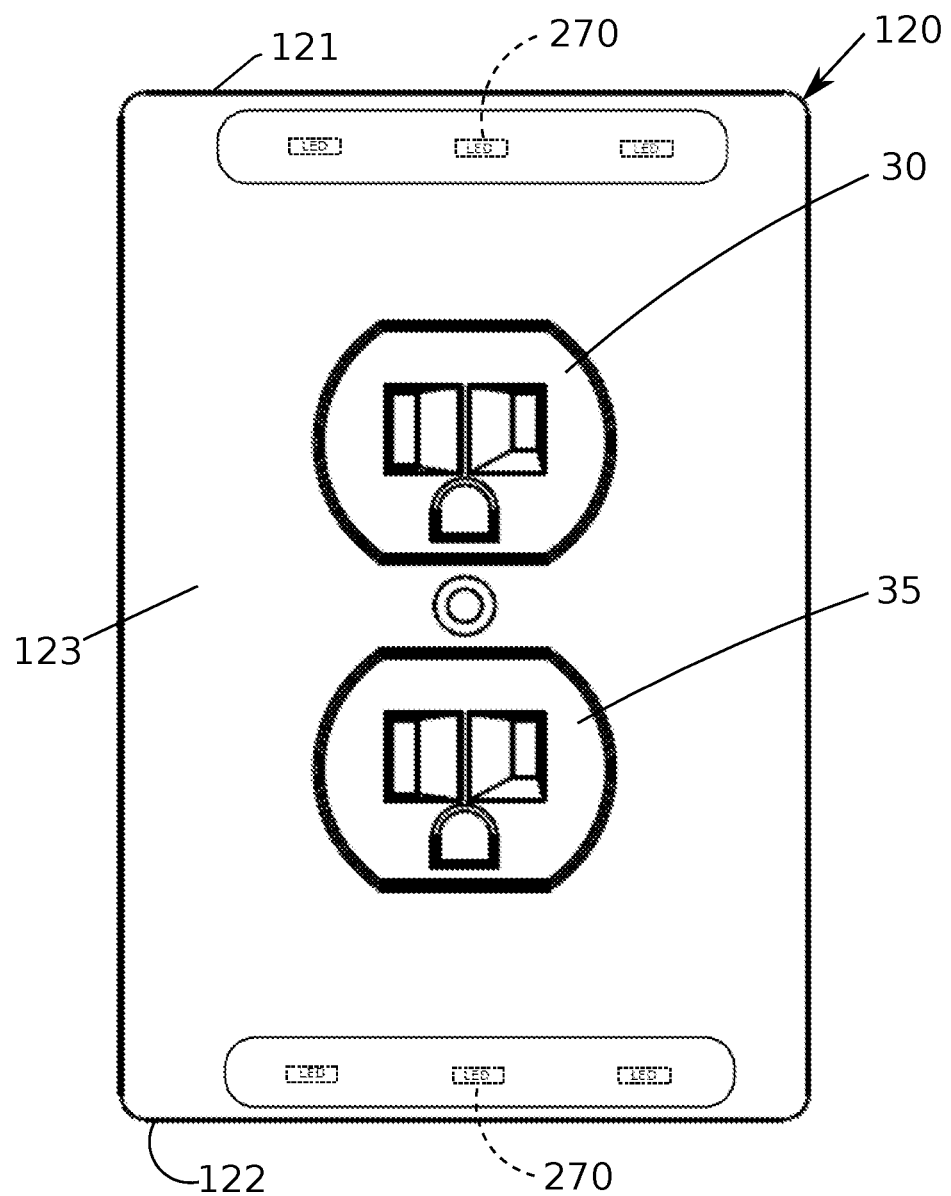
FIG. 13 is a front view of a preferred embodiment of the present invention showing the cover illuminated.

Embedded cover electronics 260 are shown embedded within a channel 250 to provide power to LEDs 270 in FIG. 7. The LEDs are preferably recessed from the front surface of the cover. In this regard, the front cover can have areas that glow as seen in FIG. 13. The LEDs can be alternatively located and shine differently without departing from the broad aspects of the present invention. The electronics 260 are powered by the wires 15 supplying power to the receptacle, as electricity is transmitted through the screws and prongs, respectively, to the electronics.

Figure 14:
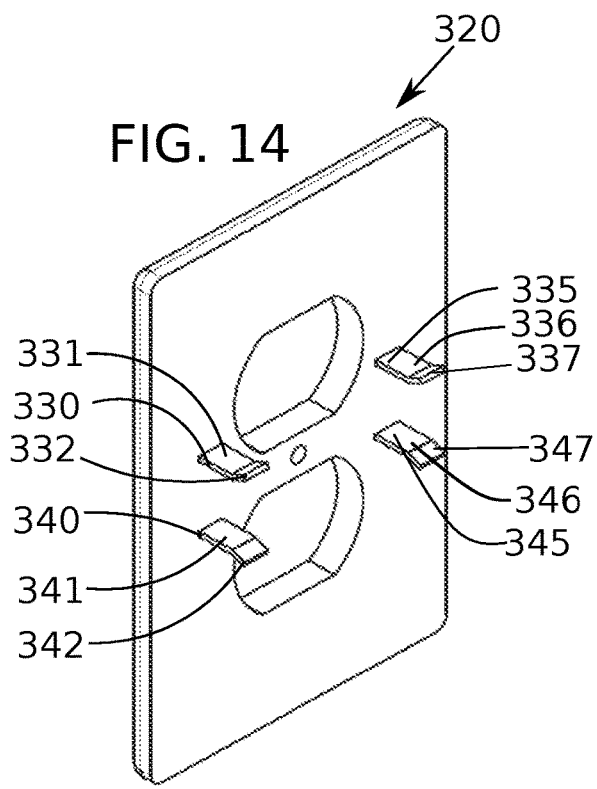
FIG. 14 is a rear perspective view of an alternative preferred embodiment of a cover of the present invention.
Figure 15:
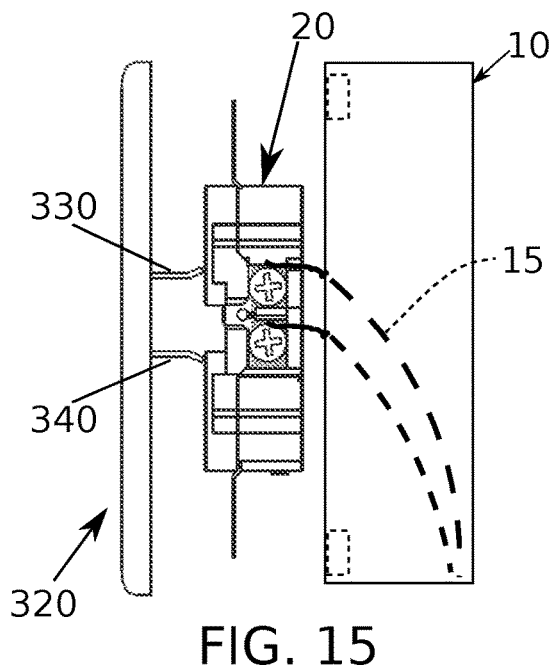
FIG. 15 is similar to FIG. 14, but additionally shows a receptacle and an electric box.
Figure 16:
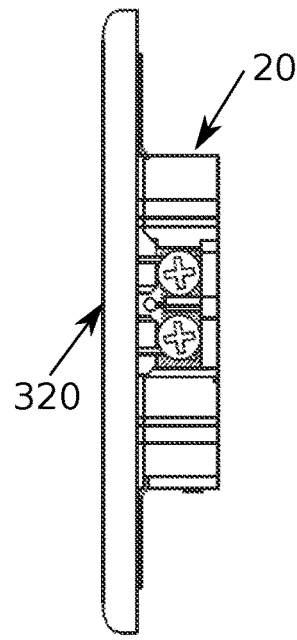
FIG. 16 is similar to FIG. 14, but shows the cover connected to the receptacle.

Turning now to FIGS. 14-16, it is seen that an alternative preferred embodiment of the present invention is illustrated. In this embodiment, a cover 320 is provided having four prongs, including two upper prongs 330 and 335. Prong 330 has a body 331 with an upward flare 332. Prong 335 has a body 336 with an upward flare 337. The cover 320 further has two lower prongs 340 and 345. Prong 340 has a body 341 with a downward flare 342. Prong 345 has a body 346 with a downward flare 347. The upper flares contact the top of upper screw seats and the lower flares contact the bottom of lower screw seats. The bodies of the prongs are slightly bent when engaging the seats of the screws, whereby developed spring tension within the bodies maintains electric engagement between the prongs and screws.

Turning now to FIGS. 17-19, it is seen that an alternative preferred embodiment of the present invention is illustrated. In this embodiment, a cover 420 is provided having four prongs, including two upper prongs 430 and 435. Prong 430 has a body 431 with a downward flare 432. Prong 435 has a body 436 with a downward flare 437. The cover 420 further has two lower prongs 440 and 445. Prong 440 has a body 441 with an upward flare 442. Prong 445 has a body 446 with an upward flare 447. The upper flares contact the bottom of upper screw seats and the lower flares contact the top of lower screw seats. The bodies of the prongs are slightly bent when engaging the seats of the screws, whereby developed spring tension within the bodies maintains electric engagement between the prongs and screws.

Figure 20:
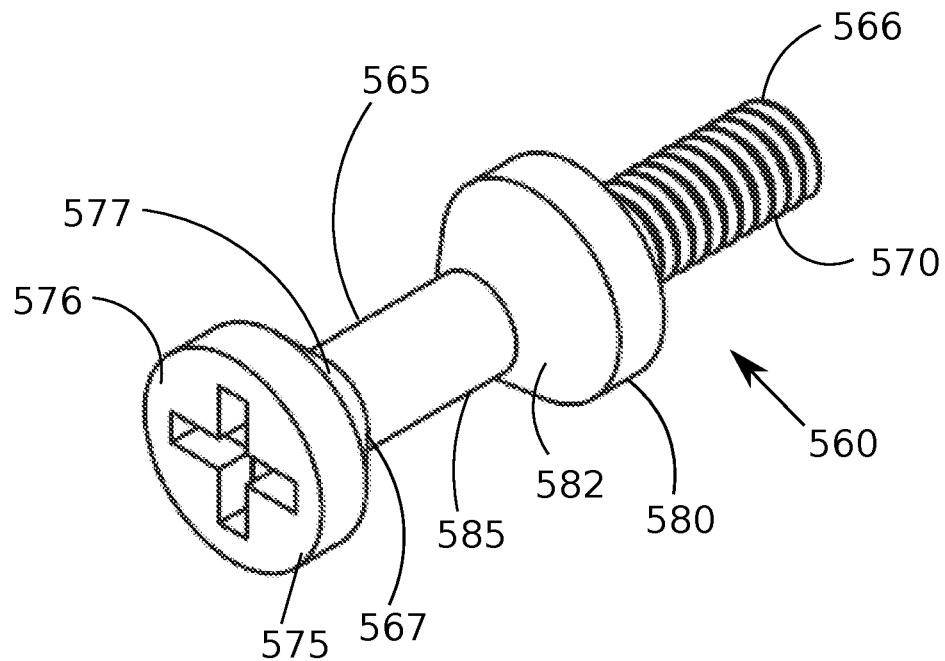
FIG. 20 is a perspective view of an alternative preferred embodiment of a screw of the present invention.
Figure 21:
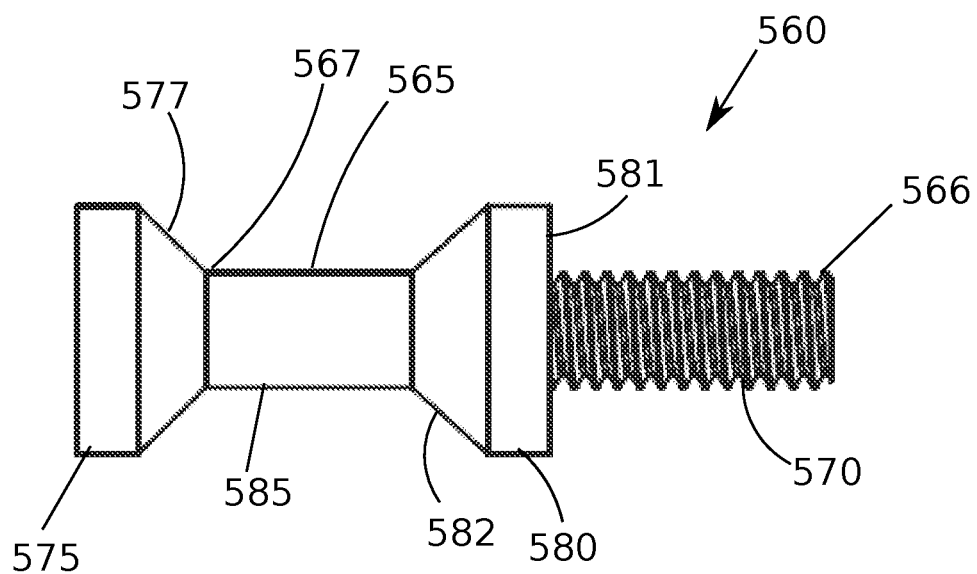
FIG. 21 is a side view of the embodiment illustrated in FIG. 20.
Figure 22:
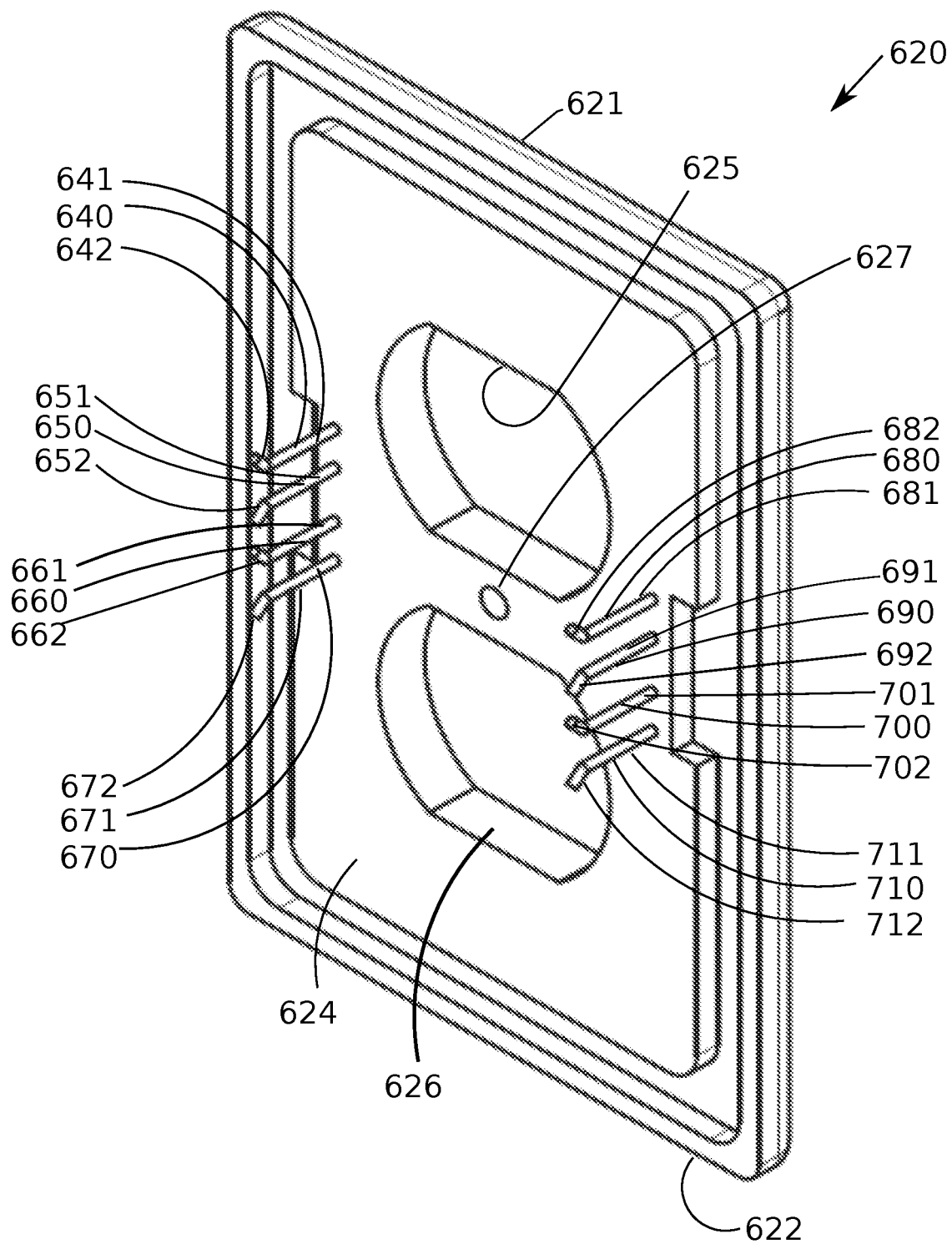
FIG. 22 is a perspective rear view of an alternative preferred embodiment of the cover of the present invention.
Figure 23:
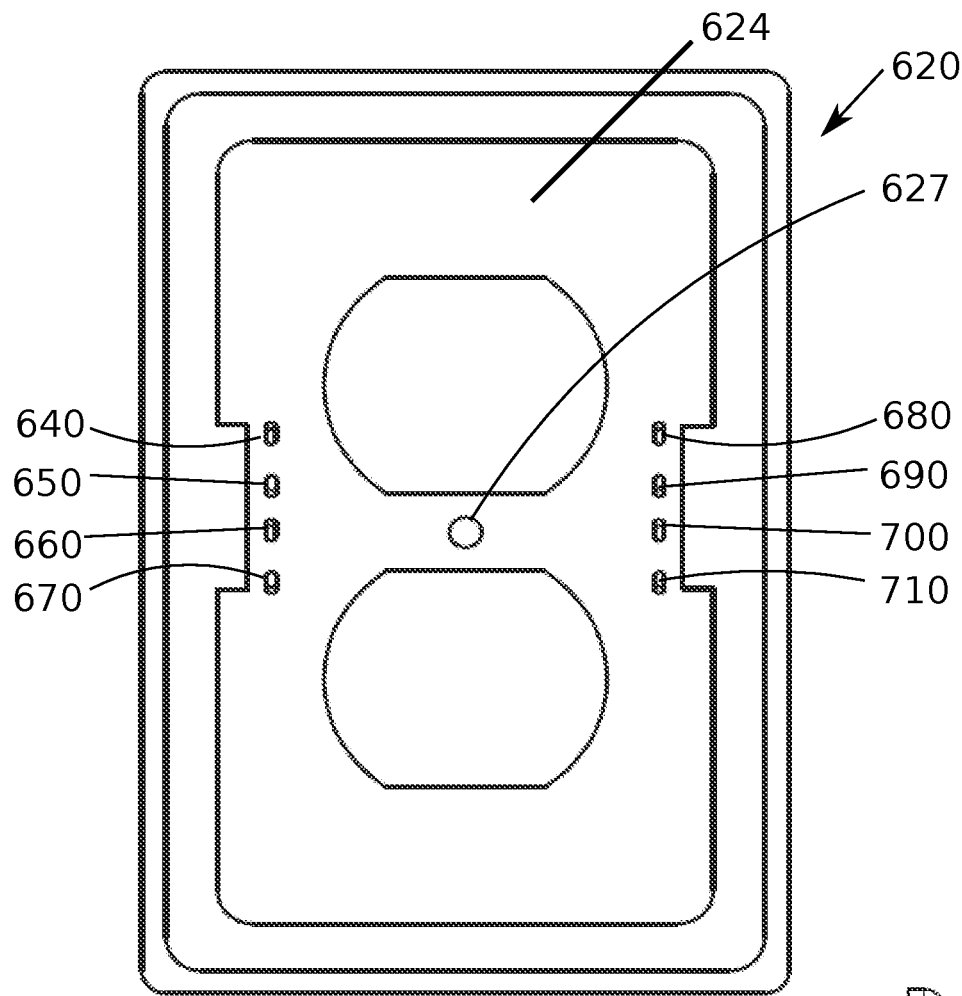
FIG. 23 is a rear view of the embodiment illustrated in FIG. 22.
Figure 24:
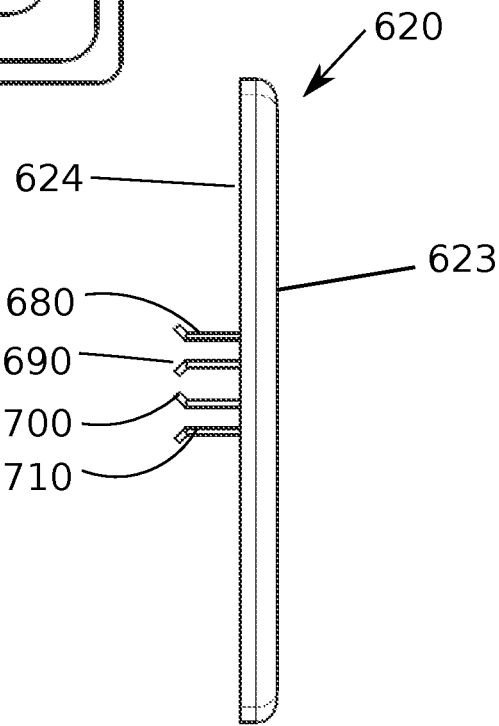
FIG. 24 is a side view of the embodiment illustrated in FIG. 22.
Figure 25:
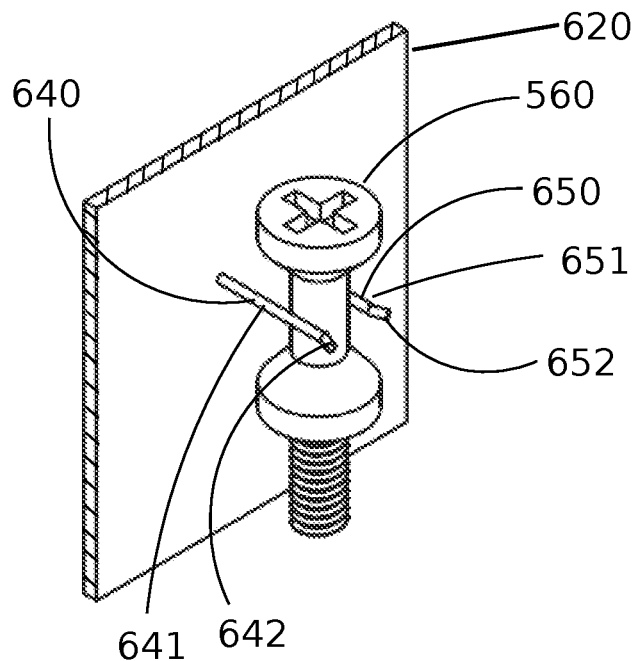
FIG. 25 is a close-up perspective view showing prongs engaging a screw.
Figure 26:
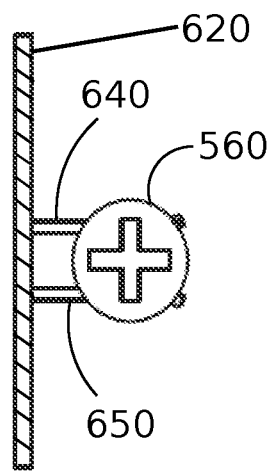
FIG. 26 is an end view of FIG. 25.
Figure 27:
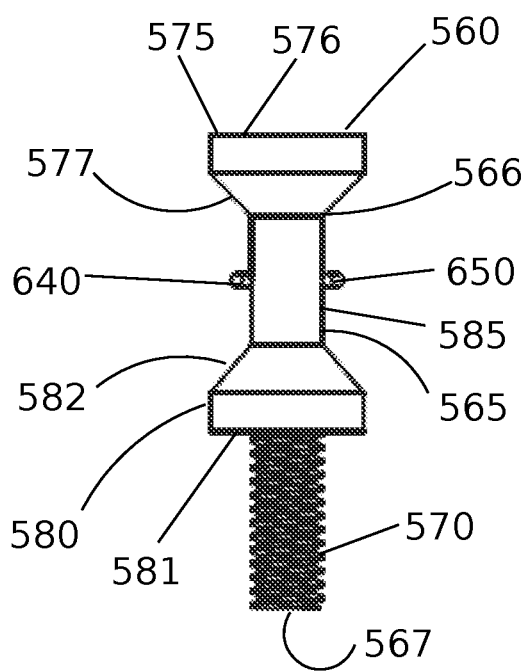
FIG. 27 is a side view of FIG. 25.

Turning now to FIGS. 20 and 21, it is seen that an alternative embodiment of a screw 560 is illustrated. The screw 560 has a shaft 565 with a first end 566 and a second end 567. A drive head 575 is at the second end 567 of the shaft. Drive head 575 has indentations to interact with a driver, such as a Phillips driver. It is understood that other shapes including but not limited to flat-head, square-head, and star-shaped indentations could be used without departing from the broad aspects of the present invention. The first end 566 of the shaft is threaded with threads 570. An intermediate head 580 is between the first and second ends 566 and 567 of the shaft. The drive head 575 has a flat side 576 with indentations for the driver, and a tapered or angled side or face 577. In this regard, the head is narrower at the distal end remote from the shaft. The intermediate head 580 has a flat side 581 adjacent the threads 570 and a tapered or angled side or face 582. In this regard, the head is narrower at the distal end remote from the shaft. Tapered side 577 of head 575 is closest to tapered side 582 of side 580, wherein the head have inwardly facing angled faces. The portion of the shaft 565 between the heads 575 and 580 is a seat 585. Tapered sides 577 and 582 of heads 575 and 580, respectively, aid in directing prongs to the seat 585 of the prongs contact an angled face. The length of the seat 585 along the screw longitudinal axis is the distance between the heads 575 and 580.

Turning now to FIGS. 22-27, it is seen that an alternative preferred embodiment of a cover 620 is illustrated. The cover 620 has a top 621, a bottom 622, a front 623 and a back 624. Two outlet holes 625 and 626 are provided and are shaped and sized to allow access to outlets and of the receptacle. A fastener hole 627 is provided through the middle of the cover for fastening the cover 620 to the receptacle in a manner wherein a cover perimeter edge contacts the wall. Eight prongs 640, 650, 660, 670, 680, 690, 700 and 710 are provided. The prongs are arranged in groups of two.

Prong 640 has a body 641 and a flare 642. Prong 650 has a body 651 and a flare 652. Prongs 640 and 650 are preferably grouped together and cooperate with each other. Bodies 641 and 651 are preferably round and spaced apart a selected amount, which is preferably slightly less than shaft width of screw 560. Flares 642 and 652 are divergent relative to the bodies wherein the distance between the paired prongs is greater at the flare distal ends than at the flare proximal ends. The prongs 640 and 650 are flexible in all directions (on account of having round bodies), including but not limited to both the up and down directions (bend relative to the screw shaft) and the left/right directions (bend relative to a tapered face). The prongs have a spring bias towards the seat of the screw when engaging the seat of the screw.

Prong 660 has a body 661 and a flare 662. Prong 670 has a body 671 and a flare 672. Prongs 660 and 670 are preferably grouped together and cooperate with each other. Bodies 661 and 671 are preferably round and spaced apart a selected amount, which is preferably slightly less than shaft width of a screw. Flares 662 and 672 are divergent relative to the bodies wherein the distance between the paired prongs is greater at the flare distal ends than at the flare proximal ends. The prongs 660 and 670 are flexible in all directions (on account of having round bodies), including but not limited to both the up and down directions (bend relative to the screw shaft) and the left/right directions (bend relative to a tapered face). The prongs have a spring bias towards the seat of the screw when engaging the seat of the screw.

Prong 680 has a body 681 and a flare 682. Prong 690 has a body 691 and a flare 692. Prongs 680 and 690 are preferably grouped together and cooperate with each other. Bodies 681 and 691 are preferably round and spaced apart a selected amount, which is preferably slightly less than shaft width of a screw. Flares 682 and 692 are divergent relative to the bodies wherein the distance between the paired prongs is greater at the flare distal ends than at the flare proximal ends. The prongs 680 and 690 are flexible in all directions (on account of having round bodies), including but not limited to both the up and down directions (bend relative to the screw shaft) and the left/right directions (bend relative to a tapered face). The prongs have a spring bias towards the seat of the screw when engaging the seat of the screw.

Prong 700 has a body 701 and a flare 702. Prong 710 has a body 711 and a flare 712. Prongs 700 and 710 are preferably grouped together and cooperate with each other. Bodies 701 and 711 are preferably round and spaced apart a selected amount, which is preferably slightly less than shaft width of a screw. Flares 702 and 712 are divergent relative to the bodies wherein the distance between the paired prongs is greater at the flare distal ends than at the flare proximal ends. The prongs 700 and 710 are flexible in all directions (on account of having round bodies), including but not limited to both the up and down directions (bend relative to the screw shaft) and the left/right directions (bend relative to a tapered face). The prongs have a spring bias towards the seat of the screw when engaging the seat of the screw.

Figure 28:
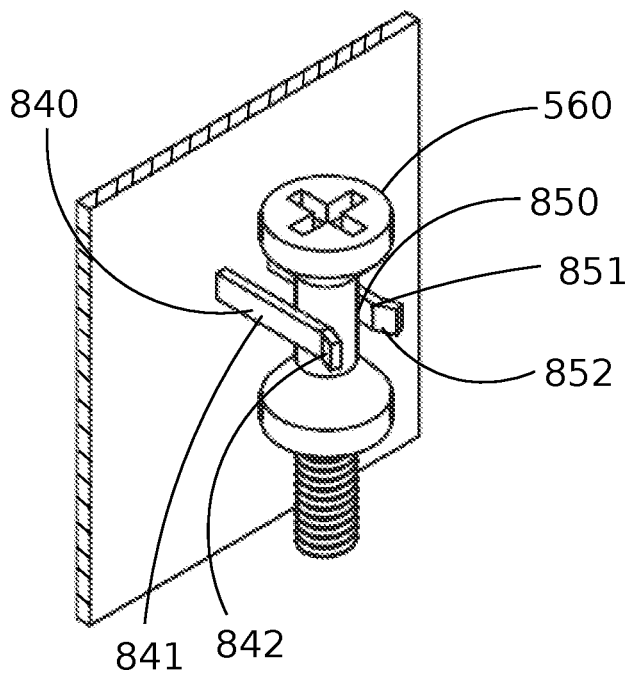
FIG. 28 is a close-up perspective view showing alternative shaped prongs engaging a screw.
Figure 29:
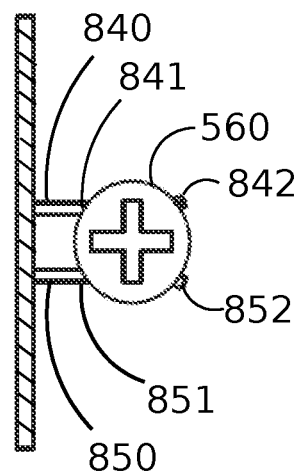
FIG. 29 is an end view of FIG. 28.
Figure 30:
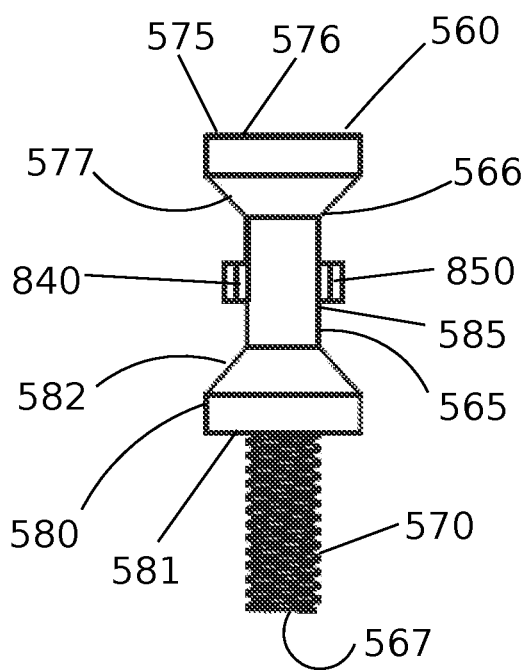
FIG. 30 is a side view of FIG. 28.

Alternative shaped prongs 840 and 850 are illustrated in FIGS. 28-30. Prong 840 has a body 841 and a flare 842 at the prong distal end. Prong 850 has a body 851 and a flare 852 at the body distal end. Prongs 840 and 850 can each have a rectangular profile that engages the seat 585 of screw 560 on opposite sides of the shaft 565. The longer dimension of the rectangular profile is narrow with respect to the length of the seat 585 allowing for relatively increased screw positioning while still being engageable by the prongs.

It is appreciated that while several embodiments are illustrated herein having either four prongs or four pairs of prongs to engage the screws, that the present invention is not so limited. Two prongs, or two sets of prongs, one on each side of the receptacle, could be used to connect to screws to supply power to the embedded electronics without departing from the broad aspects of the present invention.

Thus, it is apparent that there has been provided, in accordance with the invention, an electrical receptacle and outlet cover with electrical components that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An assembly comprising:
   an electrical receptacle comprising:
      a screw hole; and
      a screw, said screw having a drive head and an intermediate head, wherein said screw has a seat between said drive head and said intermediate head; and
   a cover, said cover having a prong, said prong selectably engaging said seat when said cover is inserted over said electrical receptacle, said cover having electronics that are powered via said prong.

2. The assembly of claim 1, wherein:
   said screw hole is a first screw hole and said screw is a first screw with a first screw seat, said electrical receptacle further comprising a second screw hole receiving a second screw with a second screw seat, a third screw hole receiving a third screw with a third screw seat and a fourth screw hole receiving a fourth screw with a fourth screw seat; and
   said prong is a first prong selectably engaging said first screw seat, and said cover further comprises a second prong selectably engaging said second screw seat, a third prong selectably engaging said third screw seat and a fourth prong selectably engaging said fourth screw seat when said cover is inserted over said electrical receptacle.

3. The assembly of claim 1 wherein said prong is first prong is part of a first pair of prongs with a first pair first prong and a first pair second prong, said first pair first prong and said first pair second prong engaging said seat.

4. The assembly of claim 3 wherein:
   said seat has a seat top and a seat bottom;
   said first pair first prong engages said seat top; and
   said first pair second prong engages said seat bottom.

5. The assembly of claim 3 wherein said first pair first prong has a first pair first prong flare and said first pair second prong has a first pair second prong flare, said first pair first prong flare and said first pair second prong flare being divergent.

6. The assembly of claim 1 wherein said screw is threaded with threads on an end opposite of said drive head.

7. The assembly of claim 6 wherein:
   said drive head has a drive head tapered face;
   said intermediate head has an intermediate head tapered face; and
   said drive head tapered face faces said intermediate head tapered face, and said drive head tapered face and said intermediate head tapered face are located on opposite ends of said seat.

8. The assembly of claim 7 wherein said prong is laterally elastic, whereby said prong can bend laterally if said prong contacts either of said drive head tapered face or said intermediate head tapered face when said cover is being installed over said electrical receptacle.

9. The assembly of claim 6 wherein said screw is selectably turnable into said screw hole a selected amount, yet said prong nevertheless engages said seat when said cover is inserted over said electrical receptacle.

10. The assembly of claim 1 wherein said prong is vertically elastic, whereby spring tension caused by engagement of said prong and said seat maintains engagement of said prong and said seat.

* * * * *